(12) United States Patent
Mackenzie et al.

(10) Patent No.: US 11,240,727 B2
(45) Date of Patent: Feb. 1, 2022

(54) TELECOMMUNICATIONS NETWORK

(71) Applicant: British Telecommunications Public Limited Company, London (GB)

(72) Inventors: Richard Mackenzie, London (GB); Jonathan Hart, London (GB); David Townend, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/762,040

(22) PCT Filed: Sep. 26, 2016

(86) PCT No.: PCT/EP2016/072803
§ 371 (c)(1),
(2) Date: Mar. 21, 2018

(87) PCT Pub. No.: WO2017/055200
PCT Pub. Date: Apr. 6, 2017

(65) Prior Publication Data
US 2018/0262965 A1 Sep. 13, 2018

(30) Foreign Application Priority Data
Sep. 28, 2015 (EP) .................................... 15187172

(51) Int. Cl.
*H04W 36/32* (2009.01)
*H04W 48/20* (2009.01)
(Continued)

(52) U.S. Cl.
CPC ........... *H04W 36/32* (2013.01); *H04W 48/16* (2013.01); *H04W 48/20* (2013.01);
(Continued)

(58) Field of Classification Search
CPC ...... H04W 36/32; H04W 48/16; H04W 48/20
See application file for complete search history.

(56) References Cited

U.S. PATENT DOCUMENTS 7,693,106 B1 * 4/2010 Ishikawa ............... H04W 48/16
370/331
8,121,090 B1 2/2012 Dinan et al.
(Continued)

FOREIGN PATENT DOCUMENTS

EP 2360969 A1 8/2011
EP 2362689 A1 8/2011
(Continued)

OTHER PUBLICATIONS

Written Opinion of the International Searching Authority for corresponding International Application No. PCT/EP2016/07280320 dated Dec. 14, 2016; 7 pages.
(Continued)

*Primary Examiner* — Walli Z Butt
*Assistant Examiner* — Thad N Defauw
(74) *Attorney, Agent, or Firm* — Patterson Thuente Pedersen, P.A.

(57) ABSTRACT

The disclosure provides an improved method of operating a mobile terminal or user equipment in a cellular telecommunications network to efficiently discover preferred cells, in particular a HeNB, prior to connecting. Whilst constant searching for a preferred cell can ensure it is found as soon as it is within range, this has a significant impact on resources at the UE, such as battery power, and can disrupt any existing services that might be running. The proposed method determines the probability of the UE being within range of a preferred cell based on measurements already available to the UE or by the network. Additional measurements can then be made as required, and made with increas-
(Continued)

ing frequency as the probability of being within range of the preferred cell increases.

16 Claims, 6 Drawing Sheets

(51) Int. Cl.
*H04W 48/16* (2009.01)
*H04W 52/02* (2009.01)
*H04W 84/04* (2009.01)

(52) U.S. Cl.
CPC ...... *H04W 52/0241* (2013.01); *H04W 84/045* (2013.01); *Y02D 30/70* (2020.08)

(56) References Cited

U.S. PATENT DOCUMENTS

| | | | |
|---|---|---|---|
| 8,204,481 B2 | 6/2012 | Kone | |
| 2009/0098873 A1 | 4/2009 | Gogic | |
| 2009/0168676 A1 | 7/2009 | Olson | |
| 2009/0247170 A1* | 10/2009 | Balasubramanian | ........................ H04W 52/0229 455/445 |
| 2010/0048217 A1 | 2/2010 | Deshpande et al. | |
| 2010/0240365 A1 | 9/2010 | Chen | |
| 2011/0205932 A1* | 8/2011 | Ekici | ..................... H04W 36/08 370/254 |
| 2014/0092866 A1* | 4/2014 | Teyeb | ................... H04W 36/24 370/331 |
| 2014/0286213 A1* | 9/2014 | Morrison | .......... H04W 52/0264 370/311 |

FOREIGN PATENT DOCUMENTS

| | | |
|---|---|---|
| WO | WO 2008/049213 A1 | 5/2008 |
| WO | WO 2009/058068 A1 | 5/2009 |
| WO | WO 2009/120902 A1 | 10/2009 |
| WO | WO 2009/157972 A1 | 12/2009 |
| WO | WO 2011/143672 A1 | 11/2011 |
| WO | WO 2013/020522 A1 | 2/2013 |

OTHER PUBLICATIONS

International Search Report for corresponding International Application No. PCT/EP2016/072803 dated Dec. 14, 2016; 4 pages.
Search Report for corresponding GB Patent Application No. GB1517100.2, dated Mar. 7, 2016, 5pages.
Das et al., Soumya; CSG Proximity Detection Enhancement Using Out-of-band Radio of Home NodeB; Qualcomm Incorporated; San Diego, CA, USA; IV International Congress on Ultra Modem Telecommunications and Control Systems 2012; 6 pages.
Samsung; 3GPP TSG-RAN EG2 Meeting #65bis Tdoc R2-092424; Seoul, Rep. Korea, Mar. 23-27, 2009; Issues with UE autonomous search function for Home-eNB cells; 2 pages.

* cited by examiner

TELECOMMUNICATIONS NETWORK

CROSS-REFERENCE TO RELATED APPLICATIONS

The present application is a National Phase entry of PCT Application No. PCT/EP2016/072803, filed on Sep. 26, 2016, which claims priority to EP Patent Application No. 15187172.0, filed on Sep. 28, 2015, which are hereby fully incorporated herein by reference.

TECHNICAL FIELD

This disclosure relates to the field of mobile terminal mobility, and in particular to a method of operating a mobile terminal to discover preferred small cells more efficiently.

BACKGROUND

A typical cellular communications network comprises a plurality of base stations each supporting a coverage area (a "cell"). Each base station communicates with one or more User Equipment (UE), sometimes referred to as Mobile Terminals (MT), User Terminals (UT) or simply mobiles, using a radio transmission medium and a particular protocol, such as the 4th Generation (4G) Long Term Evolution (LTE) protocol. Each protocol specifies a communication spectrum (i.e. a range of frequencies of electromagnetic radiation) which is shared by all base stations for their respective communications with UEs in their cell.

An emerging technology in cellular communications networks is the femtocell, being one of a class of small cells. The femtocell is also commonly referred to a Home evolved Node B (HeNB) in an LTE network. These small cells typically operate over a much smaller coverage area than used by traditional base stations, having a coverage area of tens of meters. The HeNB is installed in a customer's premises, such as the customer's home or office environment, and acts as a base station to provide radio access to the cellular communications network. The HeNB therefore has a backhaul connection to the cellular communications network, typically over the femtocell's xDSL connection.

It is expected that HeNBs will be widely deployed in LTE networks as they offer users greater data rates via their cellular communications network for connected UEs. Call or roaming charges may be less when connected to a HeNB, and additional services may be available. Therefore, it is preferable to connect to a HeNB as soon as possible when such incentives are available.

There are several techniques that can allow for mobility to HeNBs.

If the UE is connected to a macro/pico/femtocell cell in active mode, the serving cell makes the decision for any handover to a HeNB. The serving cell can request the UE to make measurements for a HeNB. The problem here is that the additional measurements can impair user experience. This is particularly the case when the HeNB is on a different layer (frequency) to the serving cell, receive no service from the serving cell temporarily while making measurements and thus potentially affecting the user's service. Furthermore, the additional measurements can also increase power consumption, draining battery power, and can reduce the performance (e.g. due to additional measurement gaps) of the UE.

If the UE is connected to a macro/pico cell in active mode, the UE can inform the macro/pico that it is within range of a HeNB if that HeNB uses closed subscriber group (CSG) mode and that CSG ID is in the mobile terminal's CSG whitelist. The message the UE sends to the serving cell is called a proximity indication. The serving cell should then decide to initiate the handover to that HeNB. The UE can discover that it is in range of the HeNB using an autonomous search function. However, the standards do not set out how the autonomous search function might work.

If the UE is connected to a macro/pico cell in idle mode, the UE can make the decision to reselect to the HeNB. If the HeNB is on a different layer from the serving cell then priorities can be used to encourage the mobile terminal to move to these higher priority layers. Priorities can be broadcast or applied to individual UEs. By assigning a HeNB layer as a higher priority, this may encourage higher priority layers to be found. However, the constant searching can increase power consumption and does not guarantee fast discovery of higher priority layers (e.g. in the standards a UE only has to search for one higher priority layer each minute. Also there may be several higher priority layers and the order is not fixed.)

If the UE is connected to a macro/pico cell in idle mode, the UE makes the decision to reselect to the HeNB. If the HeNB supports CSG, then an autonomous search function in the UE can discover that the UE is in range to reselect the HeNB if it is in the UE's whitelist.

Whichever method the UE uses to connect to a HeNB, an underlying problem exists, which is identifying that a preferred HeNB is in range. As suggested above, the UE can perform additional measurements to try and identify if the node is in range. However, such measurements require processing and battery power.

"CSG Proximity Detection Enhancement Using Out-of-band Radio of Home NodeB", by S. Das et al., IV International Congress on Ultra Modern Telecommunications and Control Systems 2012, describes a technique where a CSG cell uses collocated WiFi as the indication that a mobile terminal is in range of a CSG cell.

U.S. Pat. No. 8,204,481 describes a concept of an autonomous search function that can be used when the mobile terminal is in either idle or connected mode. This shows the ability for the autonomous function to be turned on and off.

SUMMARY

It is the aim of examples of the present disclosure to provide an improved method of managing a user terminal in relation to femtocell connection.

According to one aspect of the present disclosure, there is provided a method of operating a mobile terminal in a telecommunications network comprising a plurality of cells, said method comprising: storing a cell preference list comprising a preferred cell from the plurality of cells in the telecommunication network; estimating a route taken by the mobile terminal; determining the probability of the mobile terminal being within range of the preferred cell using the estimated route; repeatedly performing actions to find the preferred cell, wherein the interval between actions is dependent on the determined probability; and connecting to the preferred cell.

The interval between actions may be dependent on a predicted location and speed of the mobile terminal. The interval between actions may decrease as the probability of the mobile terminal being within range of the preferred cell increases.

The preferred cell may have an associated priority, and determining the interval between actions may be dependent on the priority of the preferred cell.

According to a further aspect of the present disclosure, there is provided mobile terminal comprising: a store for storing a cell preference list comprising a preferred cell from a plurality of cells in a telecommunication network; a control unit configured to estimate a route taken by the mobile terminal, and probability of the mobile terminal being within range of the preferred cell, to determine the probability of the mobile terminal being within range of the preferred cell using the estimated route, and to repeatedly perform actions to find the preferred cell, wherein the interval between actions is dependent on the determined probability; and a connection module adapted to connect the mobile terminal to the preferred cell.

BRIEF DESCRIPTION OF THE FIGURES

For a better understanding of the present disclosure reference will now be made by way of example only to the accompanying drawings, in which.

DETAILED DESCRIPTION OF EMBODIMENTS

The present disclosure is described herein with reference to particular examples. The invention is not, however, limited to such examples.

Examples of the present disclosure provide an improved method of operating a mobile terminal or user equipment in a cellular telecommunications network to efficiently discover preferred cells, in particular a HeNB, prior to connecting. Whilst constant searching for a preferred cell can ensure it is found as soon as it is within range, this has a significant impact on resources at the UE, such as battery power, and can disrupt any existing services that might be running. The proposed method determines the probability of the UE being within range of a preferred cell based on measurements already available to the UE or by the network. Additional measurements can then be made as required, and made with increasing frequency as the probability of being within range of the preferred cell increases. Additional measurements are not made when the UE is not likely to be within range of the preferred cell. The additional measurements can take the form switching on GPS, scanning appropriate radio frequencies, switching on WiFi, and so on.

The probability of being within range of the preferred cell can be determined based on predicting the route of the UE and comparing to previous routes. The method thus minimizes additional measurements, thus reducing processing and power usage the UE, until those measurements are deemed to be useful for determining whether the UE is in range of the preferred cell.

Figure 1:
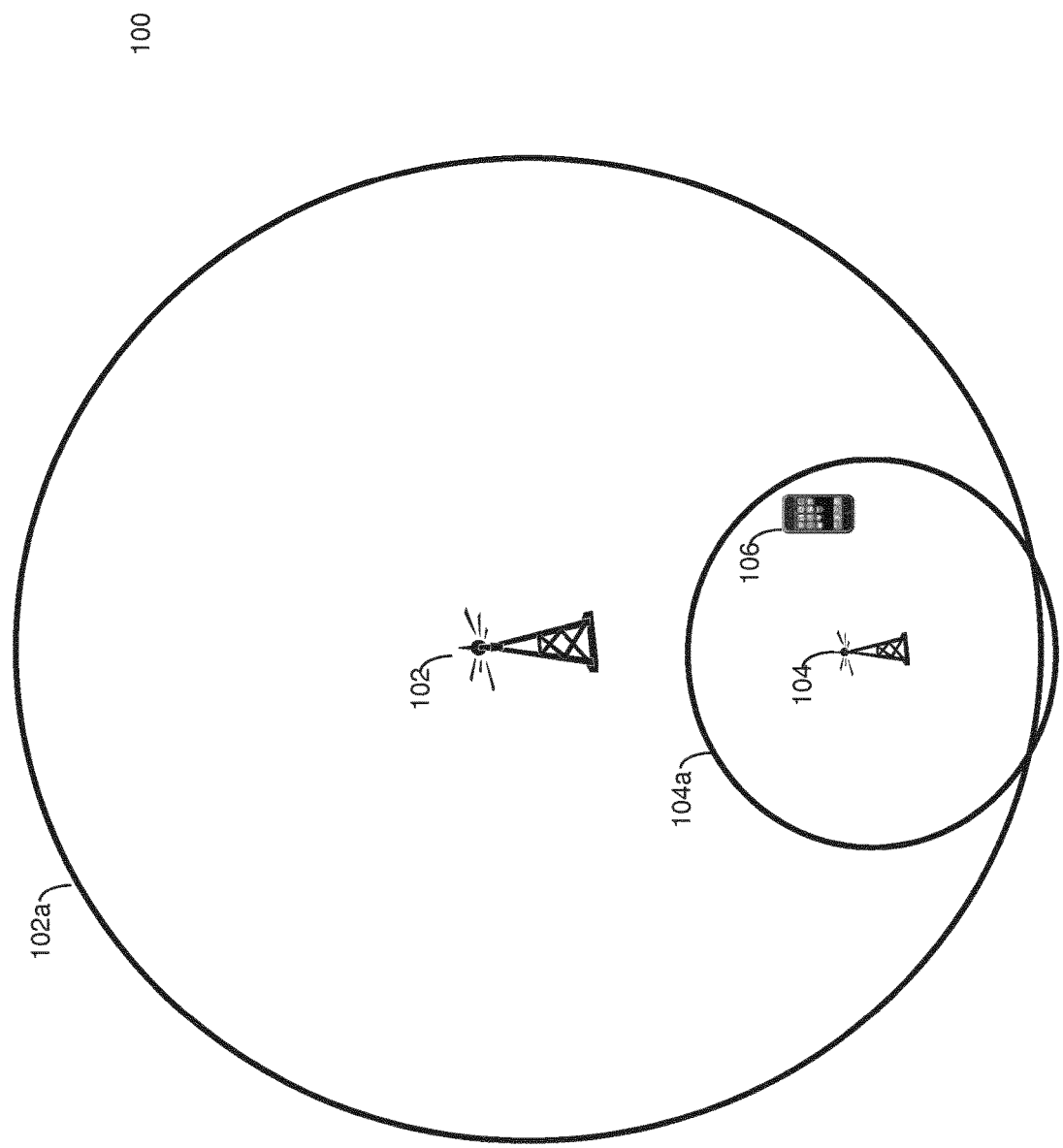
FIG. 1 is a simplified network diagram of an exemplary LTE network.

FIG. 1 shows a simplified network 100 configured for cellular communications using the 4G LTE protocol, though embodiments of the disclosure are equally applicable to networks operating according to other cellular communications protocols. The network 100 comprises a first base station 102 (also known as an evolved Node B, eNB) with a corresponding large coverage area or macrocell 102a, and a further base station 104 with a corresponding smaller coverage area or femtocell 104a (also known as a Home evolved Node B, HeNB), and a mobile terminal or user equipment (UE) 106. Other cells, including cells such as picocells, have been omitted for simplicity. The UE 106 can connect to whichever cell it is within range of. However, a UE does not always know what cells are in range that can be connected to. Examples of the present invention set out approaches for the UE to more quickly identify a preferred cell that is within range, so that it can connect to it.

Figure 3:
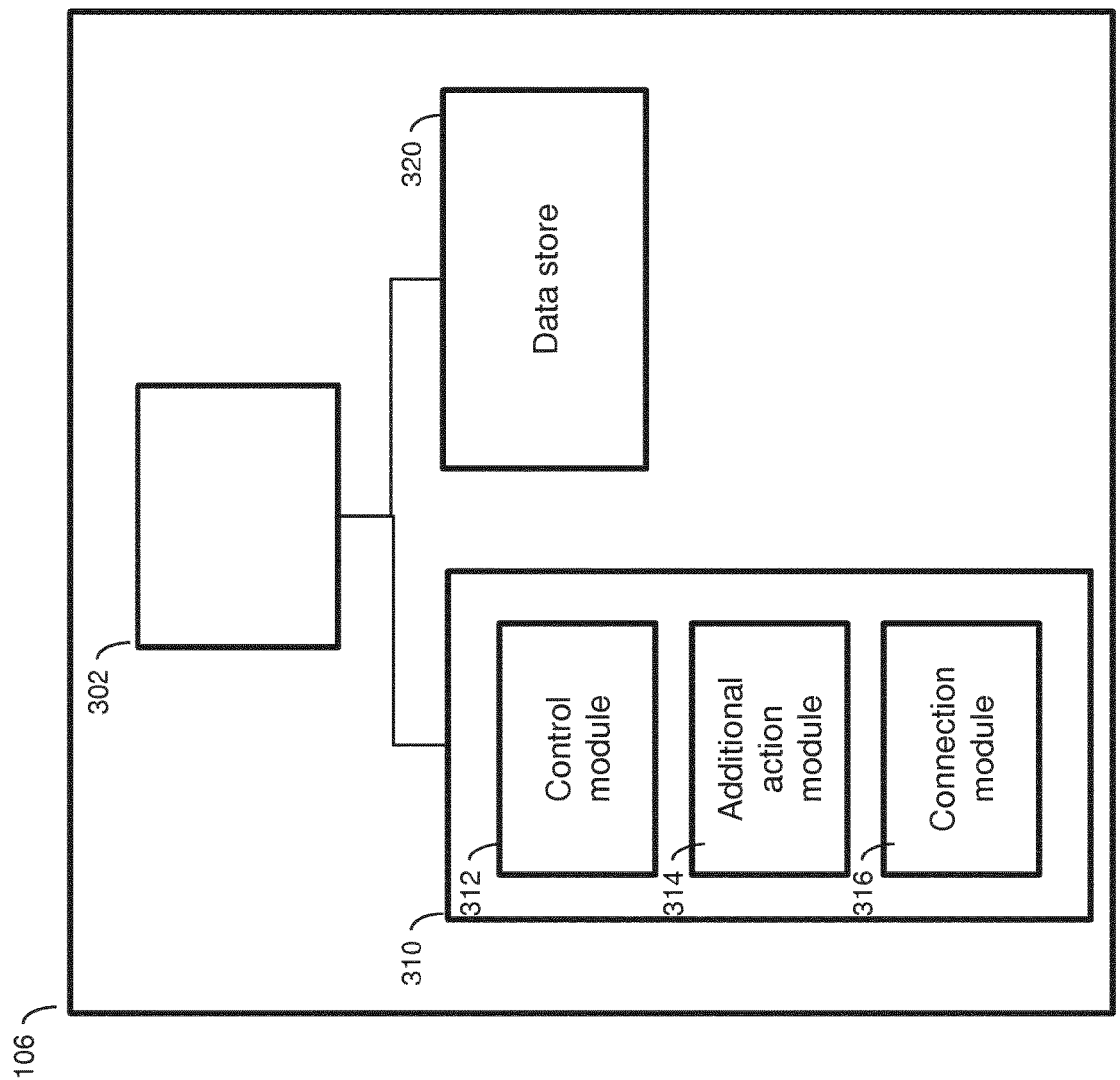
FIG. 3 is a block diagram of a UE in an example of the present disclosure.

FIG. 3 shows a block diagram of the UE 106 comprising a processor 302, program module 310 and a data store 320. The program module 310 comprises various programs for running on the processor 302, which include a control module 312, an additional action module 314, and a connection module 316. The data store 320 is used to store various data including measurements and statistics, and can take the form of memory such as solid state memory. For example, data such as the UE's cell connection history, cell signal strength, predicted UE route, historical route data, and so on can be stored in the data store 320.

Furthermore, the data store 320 stores a list of preferred cells associated with the UE. There can be one or more preferred cells. A preferred cell is typically a femtocell or HeNB associated with the UE, providing additional functionality and features as discussed earlier. Preferred cells are thus cells that the UE wishes to connect to over other cells. The list can specify the details of the cell to look for. The details may simply be a layer, e.g. the frequency that preferred cell is deployed on. It can also include the range of global cell IDs to look for. The list may also be prioritized, with the cells in the list having relative priorities, with a preference to connect to higher priority cells e.g. ECGID X1-X2 is priority one, ECGID X2-X3 is priority two. The selection of a cell as a preferred cell can be done by the user/UE and/or the network. Examples of the invention aim to locate and connect to a preferred cells in an optimized manner.

The control module 312 performs several functions including determining the probability of the UE 106 being within range of a preferred cell, and initiating searches for cells. The control module also decides when additional actions are required to discover the preferred cells more precisely, and does so by instructing the additional actions module 314. The control module 312 can balance performance with resource usage based on the importance or priority of the preferred cell.

To summarize the process, the control module 312 monitors measurements that have been made by the UE 106, including the attachment history of the UE 106 (i.e. the cells previously connected to and the associated times) stored in the data store 320. The control module 312 determines the probability of the UE 106 being within range (for a connection) of a preferred cell. This can be done by predicting the path or route the UE 106 is on as will be described later. When the determined probability is high, i.e. the UE 106 is likely to be near the preferred cell, then the control module 312 can instruct the UE 106 to take additional action to determine if the UE is actually in range, such as explicitly scanning for the preferred cell, or switching on any available location mechanism in the UE, such as GPS. This can be done repeatedly over time, with the frequency of additional actions or measurements increasing as the probability of being within range increases. Once the probability of being within range of the preferred cell is high enough, then the control unit can instruct the connection module 316 to connect to the preferred cell.

The invention will now be illustrated by way of some examples.

Figure 2:
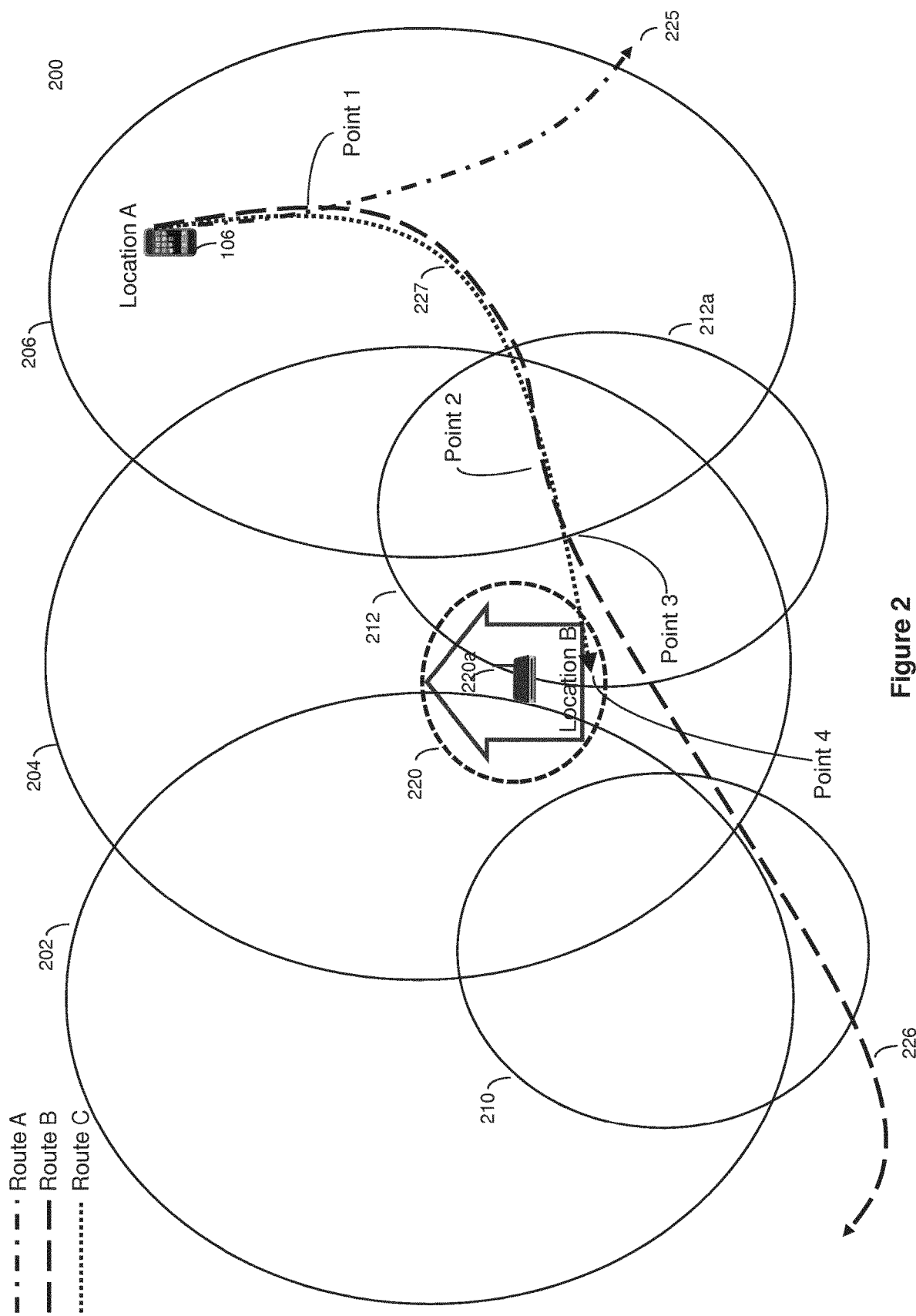
FIG. 2 is a network diagram showing a mobile terminal traversing along various routes.

FIG. 2 shows a network 200 similar to that of network 100. Coverage in network 200 is provided by 3 macrocells 202, 204 and 206, two picocells 210 and 212, and a home eNodeB (HeNB) 220. The ovals, give an approximation of the coverage of each cell. There is an access point or gateway 220a associated with the HeNB 220, though the base stations corresponding to the other cells have been omitted for simplicity.

In this example the HeNB 220 is the preferred cell for the UE 106. The UE 106 starts at location A. This is a common location for this UE to be at, and may be the user's office for example.

Three routes that the UE 106 has taken when leaving location A are also shown as lines 225, 226 and 227. Route A 225 is represented by a dot dash line, route B 226 is represented by a dashed line, and route C 227 a dotted line. These routes are all routes associated with location A learned over time by the control module 312 using measurements available to the UE 106. They are likely to be the most commonly taken routes from location A. These routes are stored in the data store 320 and can be updated over time.

The UE 106 starts its journey from location A. The control module 312 is aware that the UE 106 is in the area of location A, based on triangulation of neighboring cell measurements. The UE 106 now moves along route C which will end in location B, a location with HeNB 220. The UE 106 may switch between connected and idle states along this route. When in connected mode, the serving cell will configure measurements to be made by the UE 106. These tend to be more frequent when the UE is near the edge of the serving cell's coverage area. When the UE is in idle mode it will make measurements as usual, based on the parameters given by the serving cell. Again, measurements tend to be more frequent when the UE is near the edge of the serving cell's coverage. These measurements are stored in the data store 320 of the UE 106. The control module 312 analyses these measurements to determine how likely the UE 106 is to be within range of the HeNB 220. Based on the probability of being within range, the control module 312 can coordinate further measurements or actions to be made (by the additional action module 314) to locate the HeNB. As such, any additional measurements or actions are only made when necessary.

If measurements are made early in the route (anywhere up to point 1), then the control module 312 will conclude that the UE 106 could be on route A, route B or route C. The control unit 312 will also conclude that it is not close the preferred cell HeNB 220 at the end of either of these routes, so no additional measurements are currently required. Or put another way, the control module 312 determines that the probability of the UE 106 being within range of the HeNB 220 is very low, and as such does not instruct any additional measurements.

If measurements are made between point 1 and point 2, then the control unit 312 can deduce that the UE 106 is either on route B or route C, but is not on route A. The control unit 312 thus determines that the probability of being with range of the preferred cell, the HeNB 220, is still very low, and so decides that no additional measurements or actions are required.

When the UE 106 arrives at point 3, the UE 312 moves out of coverage of macrocell 206, which was the serving cell. Macrocell 206 will have configured the UE 106 to perform measurements on one or more frequencies. The UE 106 reports being in coverage of macrocell B 204 and picocell 212. The UE 106 is handed over or reselects to picocell 212. The control module 312 has this additional measurement information and determines that the UE 106 is still on route A and route B and that the probability of being within range of the preferred cell to be higher, but still not certain. Thus, no additional measurements are requested. However, the control module 312 may decide that the probability of being within range is sufficiently high as the UE 106 is close to the end of route C, and thus could initiate additional searches for the HeNB soon.

When the UE 106 moves between point 3 and point 4, the control unit 312 determines that the UE 106 has a high probability of being within range of the preferred cell, the HeNB 220. Thus, the control unit 312 instructs the additional actions module 314 to perform some additional measurements, which would confirm that the UE 106 is still on route C, and is almost at the end of the route.

Alternatively, if no measurements are configured by picocell 212, the control unit 312 determines that there is a high probability that the UE 106 could still be on route C. Further, by analyzing the progress along the route taken so far, the control unit 312 can estimate that the UE 106 is probably coming close to being within range of the preferred cell, the HeNB 220.

In either of the two above cases the control unit 312 will instruct the additional actions module 314 to initiate additional measurements. These measurements could be search directly for the HeNB 220, or they could be additional measurements or actions to confirm which route the UE 106 is on.

As the UE 106 moves towards the end of the route, the probability of the UE being within range of the preferred cell increases. As such the control unit 312 will instruct the additional action module 314 to perform additional searches or actions with increasing frequency, which gives the control unit 312 more certainty as to whether the UE 106 is on route C and also that it is in coverage of the HeNB 220.

Once the control unit 312 determines that the UE 106 is in the coverage area of the HeNB 220, it instructs the connection module 316 to start handover to the HeNB 220. Options of handover to the cell will be discussed later depending on whether the UE is in idle or connected mode.

The control unit 312 can use signal strength measurements associated with connected cells to predict which path the UE 106 is on, and progress along that path. Whilst this alone cannot be used for triangulation, it can be used to indicate progress along potential routes. For example, as the UE 106 moves along route C, the UE 106 will have a strong signal from the serving cell, macrocell 206, which eventually becomes weak. The UE 106 is then served by picocell 212. The signal from picocell 212 will initially be strong, then become weak again before the UE 106 nears the end of the route. The timing of these changes in signal strength can be used to determine the likelihood of being on a particular route (as well as for estimating a speed along a route), and subsequently to determine the probability of the UE being within range of the preferred cell.

Figure 2A:
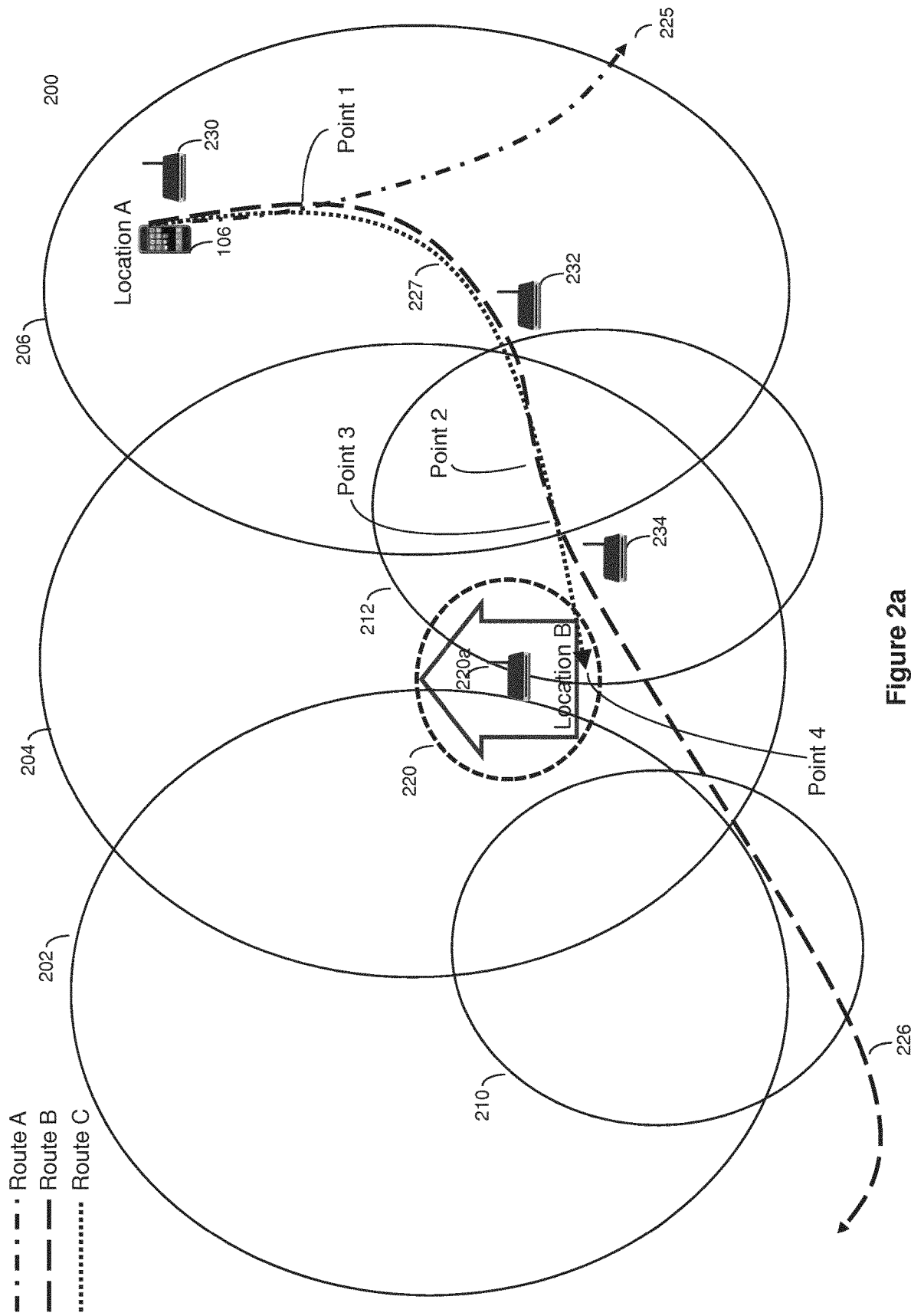
FIG. 2a is a network diagram showing a mobile terminal traversing along various routes, and includes some WiFi access points.

FIG. 2a extends on the example of FIG. 2 by including additional information to identify the route. This example includes WiFi availability. In this example, the UE 106 has WiFi enabled so will scan for WiFi as it moves along a route.

The network 200 in FIG. 2a has the same elements as in FIG. 2, and additionally has three WiFi access points (APs) or hubs 230, 232 and 234. AP 230 is located near location A where the UE 106 starts. AP 232 is located near the edge of picocell 212 on route B/C. AP 234 is located further along route B just outside the coverage area of HeNB 220.

The UE 106 starts again at location A. Here, the control unit 312 can see the availability of AP 230 as a result of WiFi scanning and measurements by the UE 106, and is thus able to confirm the starting location as location A.

As the UE 106 moves along route C, it will see the availability AP 232. This provides additional information to the control unit 312, and enables the control unit 312 to determine that that the UE 106 is likely to be on route B or route C. The control unit 312 consequently determines that there is a low probability of being in range of the preferred cell, HeNB 220, so does not trigger any additional action.

AP 234 is not seen by the UE 106, as AP 234 is only within range of the UE if it travels along route B. Route C is out of range of AP 234. AP 234 is also located soon after route B and route C diverge. Up to this point, the control unit 312 will only have information that leads it to conclude that the UE 106 is either route B or route C, but it does have an idea how far along each route the UE is. However, the control unit 312 can decide that if AP234 is not discovered within a certain number of seconds after the processing of the previous information (e.g. at point 3 where the UE is handed over to the picocell 212), then it is unlikely to be on route B, and more likely to be on route C. In this example, the UE uses this additional information (i.e. that AP 234 does not appear soon enough) to conclude that it is on route C, getting close to the preferred cell, and thus determining that the probability of being within the range of the preferred cell is fairly high, or at least increasing. The control unit 312 thus triggers the additional actions module to perform additional measurements to aid discovery of the preferred cell until the preferred cell is discovered. As the probability increases, the search frequency can also be increased. Once the preferred cell is found, the control module 312 can instruct the connection module 316 to reselect or handover to the preferred cell.

If the UE 106 does not have WiFi activated, then the control unit 312 can instruct the additional actions module to switch on WiFi for a period, in order for the control unit to gather the necessary data to confirm which path the UE is on, and it is on that path. As such, these additional measurements can be used to update the probability of the UE being within range of the preferred cell.

Figure 2B:
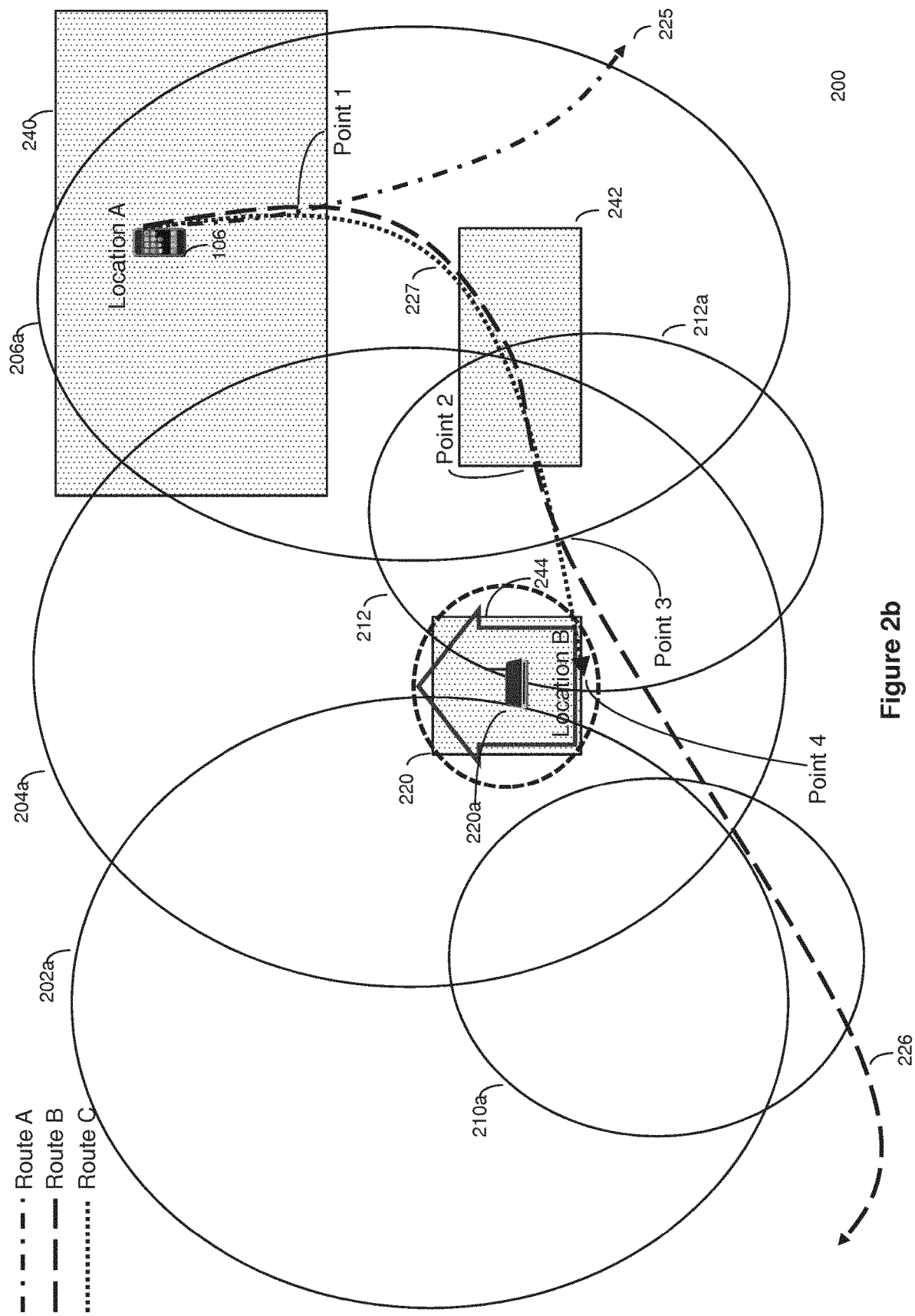
FIG. 2b is a network diagram showing a mobile terminal traversing along various routes, and includes areas without GPS coverage.

FIG. 2b extends on the example of FIG. 2. In this example, the UE 106 gets additional information about its location from its GPS receiver. In FIG. 2b, the shaded areas 240, 242 and 244 represent areas where the GPS does not work. This can be due to being indoors or in other areas where visibility of GPS signals is blocked (e.g. heavy woodland, streets between high-rise buildings).

In this example, GPS measurements provides the UE 106 with its location shortly after it leaves point A. GPS provides location updates which allow the control unit 312 to quickly tell when it is no longer on route A. The location updates also improve confidence in determining where the UE 106 is along route B and route C.

The UE will move through another area 242 where GPS is not available. GPS becomes available again from point 2. The location updates from GPS will allow the control unit 312 to determine that it is on route C, once its path diverges from route B.

The GPS updates then give a good confidence of how close to the end of route C the UE 106 is. At a certain distance before the end of route C, when the probability of the UE being within range of the preferred cell is high, the control unit 312 can initiate additional measurements to discover the preferred cell. In this example, GPS becomes unavailable at a similar time to the UE coming into range of the preferred cell. The timing between GPS becoming unavailable and the time to enter the preferred cell's coverage can also be taken into account by the control unit 312 in initiating additional measurements.

The previous two examples show how the control unit 312 can use additional information (WiFi availability and GPS location), as well as normal network measurements, to determine the probability that the UE 106 is on a particular route, and thus the probability that it is in range of the preferred cell. In both examples, the UE 106 had those additional features (WiFi and GPS) already enabled, so the cost of using these resources (e.g. additional battery consumption) is considered negligible. These features can be specifically activated by the control unit 312 if they help with determining the location of the UE 106, although there is an associated cost having such features enabled. As such, these actions are preferably only triggered by the control module 312 when it determines that the probability of the UE 106 being within range of the preferred cell is sufficiently high. For example, when the control unit 312 determines that the UE 106 is likely to be close to the preferred cell, it can enable GPS (perhaps only for a fixed period) to get a better idea of how close it is to the coverage area of the preferred cell.

Figure 4:
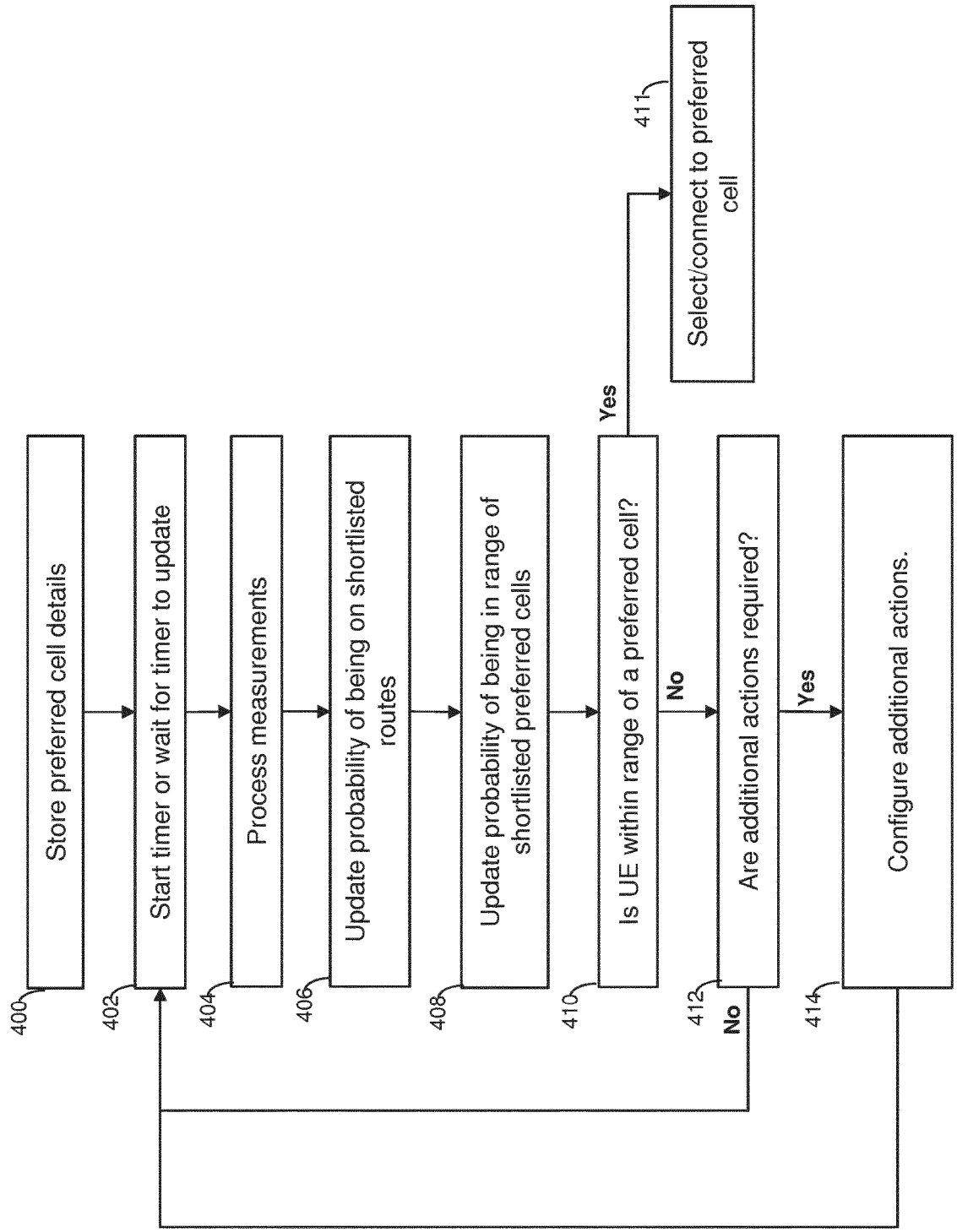
FIG. 4 is a flow chart illustrating an example of the disclosure.

An example of the disclosure is summarized in the flow chart of FIG. 4.

In 400, the preferred cells list is stored in the data store 320. As described above, the preferred cells list is a list of preferred cells associated with the UE 106, and in this example contains the identity of the HeNB 220. In 402, the control unit 312 starts a timer.

In 404, the control module 312 processes the measurements made by the UE 106 or provided by the network. These can include cell connection measurements, connection history information, and measurements from other sources such as GPS or WiFi. The measurements can be stored in the data store 320.

The data store 320 also stores a shortlist of learned routes. In 406, the control unit 312 processes the measurements from 404 to determine whether the UE 106 might be on one or more of the shortlisted routes. Examples of the disclosure can be applied to a shortlist of learned routes, where routes are removed if their probability of being used is below a threshold i.e. they are routes which are used least compared to other routes.

The control unit 312 then evaluates the routes the UE is likely to be on, and uses that to determine the probability of the UE 106 being in range of the preferred cell in 408. Matching the UE 106 onto a shortlist of routes at 406 is optional, and instead the control unit can just use the measurements from 404 to try and identify the geographic location of the UE 106, and determine the probability of being within range of the preferred cell from that.

In 410, the control unit 312 then checks to see if the UE 106 is within range of the preferred cell based on the determined probability from 408. If the UE 106 is in range, then the control unit 312 instructs the connection module 316 to either select or connect to the preferred cell in 411.

The way in which this is done will be described later, as it depends on whether the UE 106 is in idle or connected mode.

If in 410 the control unit 312 finds that the UE 106 is not within range of the preferred cell, processing passes to 412. In 412, the control unit 312 decides whether additional actions are required. If they are, then the control module 312 instructs the additional action module 316 to enable these actions in 412. These actions include those described earlier, such as configuring additional network measurements, activating WiFi, activating GPS, and changing the duration of the timer for the next evaluation (typically reducing the timer or interval between evaluations as the probability of being within range of the preferred cell increases). Actions can also include turning off features that are no longer required, e.g. turn off GPS if it is not providing sufficient benefit to justify being enabled. The control module 312 can enable these additional actions when there is a good probability that the UE is coming into range of a preferred cell using the probability determined from 408. The control unit 312 can also enable additional measurements to gain additional clarity about the route it is on, e.g. at a known place after routes diverge additional measurements may be carried out. Another example is activating WiFi at times when the presence of a particular cell can indicate the path the UE is on.

After any additional actions have been configured, processing passes back to 402, where processing continues after the timer value has elapsed. The timer value thus provides a mechanism for the whole process to be repeated at intervals, which allows the UE to move along its path before updates are made.

As described, the timer value can be adjusted according to the probability of the UE 106 being within range of the preferred cell, with the timer being reduced if the probability is high. Thus, the process is repeated with increasing frequency as the probability of being within range of the preferred cell increases. Furthermore, the timer value can be adjusted depending on where the UE 106 is on the determined route, and further on a predicted velocity along that route. Thus, if the UE 106 is moving quickly (e.g. in a car), then the timer can be set for a short duration (e.g. 10 seconds) to ensure the process is repeated at shorter intervals, whereas if the UE 106 is moving very slowly (e.g. walking on foot), then the timer can be set for a long duration (e.g. 5 minutes), especially if the UE 106 is still far away from the preferred cell. Put another way, the predicted route and speed along that route taken by the UE can be predicted, and used to determine the timer value (and thus interval between actions).

If no actions were required in 412, processing also passes back to 402.

Turning back to 411, the connection module 316 processes the request to connect to the preferred cell differently depending on whether the UE 106 is in connected or idle mode. If the UE 106 is in idle mode, the control module 312 can instruct the connection module 316 to directly connect the UE 106 to the located preferred cell. If the UE 106 is in connected mode, then the connection module 316 can inform the network that the preferred cell is in range, so that the network can arrange for handover to the preferred cell to take place.

In another example of the disclosure, a preferred cell can have different priorities. The priority can be taken into account when the control module 312 decides on the actions to take. For example, a user may specify their home femtocell as the highest priority preferred cell. They may also class a cell in a hotspot area as a lower priority preferred cell. The lower priority preferred cell may mean that very few actions are taken to discover the cell, other than using the information already provided to UE (e.g. normal network measurements plus WiFi and GPS, but only if already activated). Whereas the higher priority cell may result in additional measurements being performed and activating WiFi and GPS to constantly update the probability of being within range. The priority also provides a compromise between discovering a cell quickly and minimizing impact on the UE e.g. additional battery consumption or drops in data rates that might result whilst carrying out additional measurements (particularly when the UE is in connected mode). A user can also specify preferences to limit the amount of additional battery consumption that the method should use. These preferences can be stored in the data store 320 and can be applied to all preferred cells, certain priorities of preferred cells or specific preferred cells.

Exemplary embodiments of the disclosure are realized, at least in part, by executable computer program code which may be embodied in an application program data representing the program modules in FIG. 3. When such computer program code is loaded into the memory of the processor 302 for execution, it provides a computer program code structure which is capable of performing at least part of the methods in accordance with the above described exemplary embodiments of the disclosure.

A person skilled in the art will appreciate that the computer program structure referred can correspond to the flow charts shown in FIG. 4, where each activity of the flow chart can correspond to at least one line of computer program code and that such, in combination with the processor 302, provides apparatus for affecting the described process.

In general, it is noted herein that while the above describes examples of the invention, there are several variations and modifications which may be made to the described examples without departing from the scope of the present invention as defined in the appended claims. One skilled in the art will recognize modifications to the described examples.

The invention claimed is:

1. A method of operating a mobile terminal in a telecommunications network comprising a plurality of cells, the method comprising:
   storing a cell preference list comprising a preferred cell from the plurality of cells in the telecommunications network;
   generating a plurality of measurements by the mobile terminal as configured by at least one serving cell in the plurality of cells, each of the plurality of measurements variable relative to a coverage area of the at least one serving cell;
   estimating an estimated route to be taken by the mobile terminal based on the plurality of measurements;
   determining a probability of the mobile terminal being within range of the preferred cell using the estimated route, the probability based on the plurality of measurements and already available to the mobile terminal or the telecommunications network;
   repeatedly performing actions to find the preferred cell, wherein the repeatedly performed actions to find the preferred cell comprises generating at least one additional measurement by the mobile terminal that is not configured by at least one serving cell, and wherein an interval between actions is dependent on the determined probability; and
   connecting to the preferred cell.

2. The method according to claim 1, wherein the interval between actions is dependent on a predicted location and a speed of the mobile terminal.

3. The method according to claim 1, wherein the interval between actions decreases as the probability of the mobile terminal being within range of the preferred cell increases.

4. The method according to claim 1, wherein the preferred cell has an associated priority, and determining the interval between actions is dependent on the priority of the preferred cell.

5. The method according to claim 1, wherein when the probability is high, repeatedly performing actions comprises taking at least one additional measurement not made when the probability is low.

6. The method according to claim 1, further comprising:
setting a probability threshold for the mobile terminal being within range for a connection with the preferred cell; and
evaluating the determined probability against the probability threshold,
wherein repeatedly performing actions to find the preferred cell further is conducted when the determined probability meets the probability threshold.

7. The method according to claim 1, wherein the at least one additional measurement is at least one of switching on GPS, scanning a radio frequency, or switching on WiFi.

8. The method according to claim 1, further comprising enabling a module to generate the at least one additional measurement that was not enabled to generate the plurality of measurements.

9. A mobile terminal comprising:
a store for storing a cell preference list comprising a preferred cell from a plurality of cells in a telecommunications network, and a plurality of measurements by the mobile terminal as configured by at least one serving cell in the plurality of cells, each of the plurality of measurements variable relative to a coverage area of the at least one serving cell;
a control unit configured to estimate an estimated route to be taken by the mobile terminal based on the plurality of measurements, and a probability of the mobile terminal being within range of the preferred cell, to determine the probability of the mobile terminal being within range of the preferred cell using the estimated route, the probability based on the plurality of measurements and already available to the mobile terminal or the telecommunications network, and to repeatedly perform actions to find the preferred cell, wherein the repeatedly performed actions to find the preferred cell comprise generating at least one additional measurement by the mobile terminal that is not configured by at least one serving cell, and wherein an interval between actions is dependent on the determined probability; and
a connection module adapted to connect the mobile terminal to the preferred cell.

10. The mobile terminal of claim 9, wherein the interval between actions is dependent on a predicted location and a speed of the mobile terminal.

11. The mobile terminal of claim 9, wherein the interval between actions decreases as the probability of the mobile terminal being within range of the preferred cell increases.

12. The mobile terminal of claim 9, wherein the preferred cell has an associated priority, and determining the interval between actions is dependent on the priority of the preferred cell.

13. The mobile terminal of claim 9, wherein when the probability is high, repeatedly performing actions comprises taking at least one additional measurement not made when the probability is low.

14. The mobile terminal of claim 9, wherein the control unit is further configured to:
set a probability threshold for the mobile terminal being within range for a connection with the preferred cell; and
evaluate the determined probability against the probability threshold,
wherein repeatedly perform actions to find the preferred cell is conducted when the determined probability meets the probability threshold.

15. The mobile terminal of claim 9, wherein the at least one additional measurement is at least one of switching on GPS, scanning a radio frequency, or switching on WiFi.

16. The mobile terminal of claim 9, wherein the control unit is further configured to enable a module to generate the at least one additional measurement that was not enabled to generate the plurality of measurements.

* * * * *

UNITED STATES PATENT AND TRADEMARK OFFICE
CERTIFICATE OF CORRECTION

PATENT NO. : 11,240,727 B2
APPLICATION NO. : 15/762040
DATED : February 1, 2022
INVENTOR(S) : Richard Mackenzie et al.

It is certified that error appears in the above-identified patent and that said Letters Patent is hereby corrected as shown below:

In the Specification

In Column 1, Line 33, delete "to a" and insert -- to as --, therefor.

In Column 3, Line 56, delete "form switching" and insert -- form of switching --, therefor.

In Column 3, Line 62, delete "usage the" and insert -- usage of the --, therefor.

In Column 5, Line 54, delete "close the" and insert -- close to the --, therefor.

In Column 6, Line 1, delete "UE 312" and insert -- UE 106 --, therefor.

In Column 7, Line 12, delete "availability AP 232." and insert -- availability of AP 232. --, therefor.

In Column 7, Line 14, delete "that that" and insert -- that --, therefor.

In Column 7, Line 25, delete "idea how" and insert -- idea of how --, therefor.

In Column 9, Line 8, delete "action module 316" and insert -- action module 314 --, therefor.

Signed and Sealed this
Seventh Day of June, 2022

Katherine Kelly Vidal
*Director of the United States Patent and Trademark Office*